United States Patent [19]
Bozzato et al.

[11] 3,869,493
[45] Mar. 4, 1975

[54] NOVEL ODORANTS

[75] Inventors: Giuliano Bozzato, Kusnacht; Mario Pesaro, Zurich, both of Switzerland

[73] Assignee: Givaudon Corporation, Clifton, N.J.

[22] Filed: Feb. 5, 1973

[21] Appl. No.: 329,789

[30] Foreign Application Priority Data
Feb. 12, 1972 Switzerland.......................... 2097/72
Dec. 13, 1972 Switzerland....................... 18107/72

[52] U.S. Cl.................................. 260/464, 252/522
[51] Int. Cl............................................ C07c 121/48
[58] Field of Search..................................... 260/464

[56] References Cited
UNITED STATES PATENTS
3,157,660  11/1964  Stilz et al..................... 260/465.4 X

OTHER PUBLICATIONS

Arpe et al., C. A., 77, (1972), 126084p.

Arpe et al., Angew. Chem. Int. Ed., (Aug. 1972), Vol. 11, page 722.

Piers, et al., C. A., 69, (1968), 52325d.

Eddy et al., C. A., 41, (1947), 3575–3576.

*Primary Examiner*—Joseph P. Brust
*Attorney, Agent, or Firm*—Thomas Cifelli, Jr.

[57] ABSTRACT

Novel substituted acetonitriles, a process for their manufacture and odorant compositions containing the novel compounds are disclosed.

5 Claims, No Drawings

NOVEL ODORANTS

FIELD OF THE INVENTION

This invention relates to the field of fragrances.

SUMMARY OF THE INVENTION

The substituted-acetonitriles provided by the present invention have the following general formula

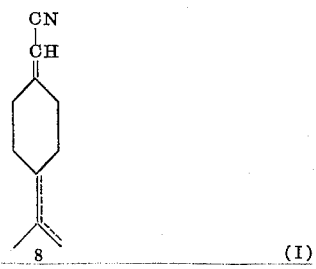

wherein the broken lines denote a double-bond emanating from the $C_8$-atom.

In other words, the substituted-acetonitriles represented by formula I are 4-isopropenyl-$\Delta^{1,\alpha}$-cyclohexan-acetonitrile and 4-isopropylidene-$\Delta^{1,\alpha}$-cyclohexan-acetonitrile.

According to the process provided by the present invention, the substituted-acetonitriles of formula I hereinbefore are manufactured by subjecting a compound of the general formula

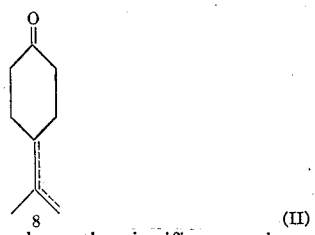

wherein the broken lines have the significance given earlier, to a cyanomethylenation.

DESCRIPTION OF THE PREFERRED EMBODIMENTS

The cyanomethylenation can be carried out according to methods known per se, expediently by reacting a compound of formula II with a di(lower alkyl)-phosphono-acetonitrile of the general formula

wherein R represents a lower alkyl group such as methyl, ethyl, propyl etc, preferably ethyl.

The reaction of a compound of formula II with a di(-lower alkyl)-phosphono-acetonitrile of formula III is expediently carried out in an organic solvent in the presence of a base.

Examples of bases which can be used are alkali metal hydrides (e.g., sodium hydride or potassium hydride), alkali metal alcoholates (e.g., sodium methylate or potassium ethylate) or alkali metal amides (e.g., sodium amide). A di(lower alkyl)-phosphono-acetonitrile of formula III is converted by means of such bases into the phosphonate form which ultimately reacts with the compound of formula II.

Suitable solvents which can be used are, for example, aromatic hydrocarbons (e.g., benzene, toluene etc), ethers (e.g., tetrahydrofuran, dioxan or 1,2-dimethoxyethane), dimethylformamide, or alcohols, when alkali metal alkoxides are used as catalysts.

The reaction can be carried out at a temperature between about 0°C and the reflux temperature of the mixture, preferably at a temperature between about 5°C and 25°C.

The reactants [i.e. a compound of formula II and a di(lower alkyl)-phosphono-acetonitrile of formula III] are expediently used in a ratio of about 1:1, but the di(-lower alkyl)-phosphono-acetonitrile of formula III can also be used in excess.

In general, the duration of the reaction amounts to 1 to 16 hours (e.g., 2 hours).

The resulting substituted-acetonitrile of formula I can be isolated from the reaction mixture in a manner known per se, expediently by the addition of water and extraction with an organic solvent. The purification is preferably carried out by distillation.

The cyanomethylenation can also be carried out in a manner known per se by heating a compound of formula II with acetonitrile in the presence of an alkali metal alcoholate as a catalyst.

Alkali metal alcoholates derived from high-boiling alcohols (e.g., sodium n-octylate) are expediently used as the catalyst.

The heating is preferably carried out in an organic solvent under reflux conditions. The water formed during the heating is advantageously removed from the mixture as it is formed, preferably by azeotropic distillation. In general, the heating can be carried out in a wide variety of organic solvents, especially aromatic hydrocarbons such as xylene, ethylbenzene and the like. However, those solvents which are relatively inexpensive and which form azeotropic mixtures with water at the temperatures at which the heating is carried out (e.g., benzene and toluene) are preferably used.

In general, the duration of the heating is not critical. It depends mainly on the amount of starting materials used and the temperature. The course of this embodiment of the process can be conveniently followed by removal of the water which forms. When no more can be collected, then it can be concluded that the formation of the desired substituted-acetonitrile of formula I is almost complete.

Although equimolar amounts of the starting materials can be used, the use of an excess of acetonitrile (e.g., up to 100 percent excess) is preferred since this is the least expensive starting material.

In a preferred embodiment of the present process there is used as the starting material mixtures of 4-isopropenyl-cyclohexanone (V) and 4-isopropylidene-cyclohexanone (VI) in the ratio of about 6:4 to 9:1, especially such mixtures as are obtained when nopinone (IV) is treated in the presence of an acidic catalyst such as sulphuric acid with orthoformic acid methyl ester and the resulting product is hydrolysed:

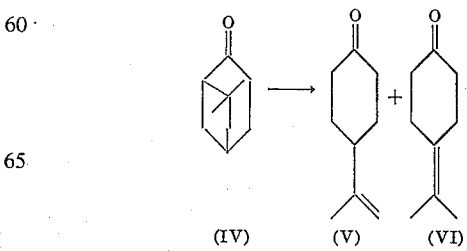

The substituted-acetonitriles of formula I provided by the present invention possess interesting odorant properties. Their fragrance can be denoted as green, caraway-like and citral-like, as well as freshly spicy. Fragrance intensity and adhesiveness are strongly pronounced.

Mixtures of 4-isopropenyl-$\Delta^{1,\alpha}$-cyclohexan-acetonitrile and 4-isopropylidene-$\Delta^{1,\alpha}$-cyclohexan-acetonitrile, especially mixtures in the ratio of 6:4 to 9:1 (e.g., 7:3) have particular interest from the fragrance point of view.

On the basis of their interesting olfactory properties, the substituted-acetonitriles of formula I or mixtures thereof can be used as odorants; for example, in perfumery for the manufacture of odorant compositions such as perfumes or for perfuming products of all kinds such as, for example, soaps (for which they are particularly suitable because of their chemical stability), washing agents, detergents, aerosols or other cosmetic products such as salves, face-milk, make-up, bath salts etc.

The concentration in which the substituted-acetonitriles of formula I are used can vary within wide limits depending on the purpose of use. For example, in perfume bases they can be present in an amount of between about 1 and about 10 wt. percent. For odorant compositions the preferred concentrations lie in the range of from about 0.1 to about 0.5 wt. percent. The concentration of a perfume base can amount, for example, to about 0.8–2 wt. percent in soaps and to 0.1–0.3 wt. percent in washing agents.

It will accordingly be appreciated that the invention also includes within its scope (a) an odorant composition which contains as an odour-imparting ingredient a substituted-acetonitrile of formula I or a mixture thereof and (b) a method of imparting an odour to materials by applying thereto or incorporating therein an odour-imparting amount of a substituted-acetonitrile of formula I or a mixture thereof or of an odorant composition as hereinbefore defined.

The following Example illustrates the process provided by the present invention:

EXAMPLE a. 96 g (2 mol) of a 50 percent sodium hydride dispersion in paraffin oil are covered with 3.35 litres of absolute benzene in a 4-necked sulphonation flask which is provided with a dropping funnel, stirrer, thermometer, reflux condenser, nitrogen inlet tube and calcium chloride tube. The mixture is cooled by means of an ice-bath to +5°C and 354 g (2 mol) of diethylphosphonoacetonitrile are added dropwise. The mixture is stirred for 15 minutes at +5°C and then for 1 hour at room temperature. 176 g (2 mol) of a mixture of 4-isopropenyl-cyclohexanone (79 percent) and 4-isopropylidene-cyclohexanone (21 percent) are added dropwise while cooling with water in such a way that the temperature does not rise above 25°C. The mixture is stirred for 2 hours at room temperature and the viscous reaction mass is then brought into solution with water. The organic phase is separated off in a separating funnel, washed neutral with water and dried over magnesium sulphate. After evaporating off the solvent, the residue is distilled over a Vigreux column. There are obtained 286 g of a crude product of boiling point 90°–100°C/0.8 Torr. The pure distillation over a Raschig-ring column (50 cm) yields 210 g of a mixture of 4-isopropenyl-$\Delta^{1,\alpha}$-cyclohexan-acetonitrile (71 percent) and 4-isopropylidene-$\Delta^{1,\alpha}$-$\alpha$-cyclohexan-acetonitrile (29 percent) of boiling point 134°–135°C/12 Torr. $n_D^{20}$: 1.5068; IR spectrum (CCl$_4$): bands at 2240, 1638 and 895 cm$^{-1}$; NMR spectrum (CDCl$_3$): $\delta = 5.1$ ppm ($s$, N≡C—CH=C); 4.7 ppm ($b$, CH$_2$=C);

1.73 ppm 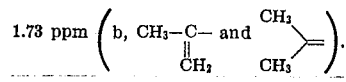

The product has a green, caraway-like odour.

A portion of the mixture was separated by preparative gas chromatography.

4-Isopropenyl-$\Delta^{1,\alpha}$-cyclohexan-acetonitrile
IR spectrum (CCl$_4$): bands at 2240, 1638 and 895 cm$^{-1}$; NMR spectrum (CDCl$_3$): $\delta = 5.1$ ppm ($s$, N≡C—CH=C); 4.7 ppm ($b$, CH$_2$=C);

1.73 ppm 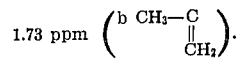

4-Isopropylidene-$\Delta^{1,\alpha}$-cyclohexan-acetonitrile
IR spectrum (CCl$_4$): bands at 2250, 1640 cm$^{-1}$; NMR spectrum (CDCl$_3$): $\delta = 5.1$ ppm ($s$, N≡C—CH=C), 1.72 ppm 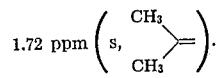

b. 13.8 g (0.1 mol) of a mixture of 4-isopropenyl-cyclohexanone (80 percent) and 4-isopropylidene-cyclohexanone (20 percent) are dissolved in 20 ml of benzene together with 8.2 g (0.2 mol) of acetonitrile. The mixture is treated with 305 mg (0.002 mol) of sodium n-octylate and heated to boiling for 20 hours under a water-separator. The reaction mixture is then worked up by washing with dilute sulphuric acid and water. After drying over magnesium sulphate and evaporation of the solvent, there are obtained 15.7 g of a crude product. Pure distillation over a Vigreux column yields 2.5 g of a mixture of 4-isopropenyl-$\Delta^{1,\alpha}$-cyclohexan-acetonitrile (68 percent) and 4-isopropylidene-$\Delta^{1,\alpha}$-cyclohexan-acetonitrile (32 percent) of boiling point 72°–78°/0.02 Torr. The physical and spectral data of the product correspond to the data given in part a) of this Example.

The mixture of 4-isopropenyl-cyclohexanone and 4-isopropylidene-cyclohexanone used as the starting material can be prepared as follows:

138 g (1.0 mol) of nopinone are treated, while stirring at 20°C, with 117 g (1.1 mol) of orthoformic acid methyl ester and 1 ml (1.85 g) of concentrated sulphuric acid. The mixture is stirred for 2.5 hours at 20°C. After the addition of 1,000 ml of acetone, 360 ml of water and 3.5 ml of 2-N sulphuric acid, the mixture is stirred for a further 2 hours and then neutralised with a solution of 2.3 g of anhydrous sodium carbonate in 5 ml of water. For the working-up, the mixture is evaporated on a rotary evaporator until two phases are formed. The organic phase is separated off and the aqueous phase shaken out 3 times with ether. The combined organic phases are then washed with a saturated sodium chloride solution, dried over magnesium sulphate and evaporated. There are obtained 135 g of a crude product which is distilled on a Vigreux column.

The following Example illustrates a typical odorant composition containing the substituted-acetonitriles provided by this invention:

EXAMPLE A

Composition of the "verbena" type suitable for perfuming soaps.

| | parts by weight |
|---|---|
| 4-isopropenyl-$\Delta^{1,\alpha}$-cyclohexan-acetonitrile/4-isopropylidene-$\Delta^{1,\alpha}$-cyclohexan-acetonitrile (7:3) | 100 |
| β-naphthol ethyl ether | 15 |
| petitgrain oil Paraguay | 100 |
| resinoïde Elemi | 50 |
| p-tertbutyl-α-methyl-hydro-cinnamaldehyde | 20 |
| orange oil Californian | 100 |
| geraniol | 200 |
| lemongrass oil | 100 |
| Baccartol Givaudan | 200 |
| guaiacum wood oil 50% in phthalic acid diethyl ester | 100 |
| | 1000 |

What we claim is:

1. Substituted-acetonitriles of the general formula

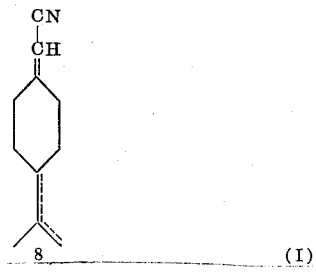

(I)

wherein the broken lines denote a double-bond emanating from the $C_8$-atom.

2. 4-Isopropenyl-$\Delta^{1,\alpha}$-cyclohexan-acetonitrile.

3. 4-Isopropylidene-$\Delta^{1,\alpha}$-cyclohexan-acetonitrile.

4. A mixture of 4-isopropenyl-$\Delta^{1,\alpha}$-cyclohexan-acetonitrile and 4-isopropylidene-$\Delta^{1,\alpha}$-cyclohexan-acetonitrile.

5. A mixture of 4-isopropenyl-$\Delta^{1,\alpha}$-cyclohexan-acetonitrile and 4-isopropylidene-$\Delta^{1,\alpha}$-cyclohexan-acetonitrile in the ratio of 6:4 to 9:1.

* * * * *